(12) United States Patent
Tyler

(10) Patent No.: X8961
(45) Date of Patent: Jul. 7, 1835

(54) THRASHING MACHINE

(76) Inventor: Joseph Tyler

Joseph Tyler, of Brooklyn State of Connecticut.

Letters Patent.

The schedule referred to in these Letters Patent and making part of the same
containing a description in the words of the said Joseph Tyler himself of his
improvement in the mode of making machines for thrashing all kinds of grain called Tylers
Improvement in Thrashing.

To all persons to whom these presents shall come.

Joseph Tyler of Brooklyn in the County of Windham and State of Connec-
ticut Gentleman sends greeting.

Be it known that the said Joseph Tyler, have invented, made, and applied
to use, a new and usefull improvement in Thrashing grain called Tylers
Improvement in Thrashing "Specified" in the words following. Viz. Specification
in Tylers improvement in thrashing. The machine is placed in a frame, which
can be removed at pleasure. Description of the frame, and directions
in what manner to build the same. The frame is built of 4 posts 4 feet high
made of solid timber 3 inches by 4 inches, with four caps on the top, framed
together and also framed and connected to the said posts by tenons and mortices
passing into the caps. One cross girt framed into the two end posts under the
apron so that the apron may rest on it 22 inches from the bottom of the posts. One
cross girt is also framed into the other end posts, the same height as the former, both
made of square timber half the size of the posts, 2 girts or side bearings running
lengthwise of the frame made of timber 2½ inches square, falling half their width
below the cross girts. These side bearings are let into the posts half an inch
and secured at each end to the posts, by an iron bolt headed at its inner
end and screw and nut at the outer end, running through the posts. These
side bearings sustain the main arbor, at each end thereof.

The frame is lined on the inside with boards 3/8 inch thick, made fast
to the inner side of the frame so that the cilinder runs within said lining
boards. Description of the machine. The main arbor is made ~~and~~ of
wrough iron 1¼ inch diameter either round or square and passes through the centre of the cilinder extending over and resting upon the side bearers.
The cilinder is 18 inches long and 18 inches in diameter and made in the usual
and common form of cilinders for the present thrashing machine with 5 iron lags at equal
distances across from end to end, in each lag there is two rows of iron beaters, rivited
and countersunk, into the lags. these beaters are three inches long. the lags are
secured to the cylinder by iron hoops at each end with rivits through them.
below the cilinder rest the under curve corresponding with the cilinder in
form, into which the cilinder moves. In this under curve is fixed two
double rows, and one single row of iron beaters, the same size and length of the
beaters in the lags, all of which are made of iron 3 inches long, and 5 in each
row, and so arranged that those on the cilinder revolve between those in the
under curve. The under curve extends from the apron to the center of
the cilinder and one inch beyond it. The upper curve covers the upper side of
the cilinder in the same manner, as the under curve does the under side of
the cilinder, and opposite to it, leaving on the front side an aperture for the
entrance of the unthrashed grain, and on the other side an apperture
for the straw and the thrashed grain, as they escape from the machine.
On each side bearer is made fast on the top of it, a rising box composed of
cast iron for the friction rollers, rising above the side bearer so as to permit the
friction rollers to revolve above the top of the side bearers. Upon each of these
rising boxes rests a pair of Friction rollers 3 inches diameter, made of cast
iron finished in the lathe with a short arbor running through each, resting
on said boxes, and upon the top of these friction rollers rests the ends
of the main arbor, so that the revolutions of the main arbor, also cause
these friction rollers to revolve upon their axes. On the end of the main
arbor is a fixed position, is the cast iron pinion wheel $2\frac{1}{2}$ inches diameter
with 19 or more coggs in the edge thereof at equal distancy.
The Driver wheel has its central position over the pinion wheel, 20 inches
in diameter, made with arms and a rim, all of cast iron. the rim 3/4 inch
thick upon the outer edge of which is cut coggs to operate with the coggs
on the pinion wheel. Through the centre of the Driver Wheel passes
an iron arbor, 1 inch diameter resting on the friction wheels, made for
the same, which run in boxes, and sustain this arbor, in the same manner as those above described for the arbor of the cilinder and to the end of this arbor is fixed the Turning Crank, with its handle composed of iron.

The arbor of the Driver wheel is secured by two iron clamps, passing over the arbor and made fast at each end by screws. The upper bearing is 3 inches through 2 inches thick secured to the posts by iron bolts at each end, with a nut and screw with a long mortice in the same up and down of sufficient width for the Driver wheel to revolve, while the arbor of the arbor wheel rests on each side of said mortice that being the position of the friction rollers for said Driver wheel.

The balance wheels are made of cast iron weighing about 75 pounds each, one of which is placed on the main arbor at each end of the cilinder, having the lining board between the cilinder and the balance wheel — these balance wheels are made with a rim and arms 24 inches diameter, and so secured to the main arbor that the balance wheels revolve with the cilinder The apron is 20 inches wide, and 36 inches deep receiving the unthrashed grain, and conducts it to the beaters, The whole machine is propelled by hand power, and may be opperated by one man, while the grain is fed by another or by any other power not exceeding the power of one man, The machine may stand on any floor, and removed at pleasure.

The several parts of said frame and Machine, may be increased or diminished, from the above dimensions, preserving the same proportions.

The present claimant does not seek a patent for the cilinder, for the beaters, for the arbors, nor for the undercurve, because those parts of the said Machine have long been in use, and are no invention of the present claimant, but he does claim that the pinion wheel, balance wheels, friction rollers, their size and proportions, and the mode of their application to this Machine are entirely new, and are of the original invention of the present claimant. and also this claimant further claims as his invention the great reduction of power necessary to propel this Machine and the great diminution of friction, which has heretofore retarded in a great measure the opperation of Machines of this description.

In testimony that the above is a true specification of my said improvement as above described I have hereunto set my hand the 1st day of April in the year of our Lord

United States Patent

Patent No.: X8961 one thousand eight hundred and thirty five.

Witnesses Andrew F. Judson
Francis B. Schuson

Joseph Taylor 1552 rds

Ex.
Chff.